United States Patent [19]

Leifeld et al.

[11] Patent Number: 5,359,753
[45] Date of Patent: Nov. 1, 1994

[54] METHOD AND APPARATUS FOR PLACING FIBER BALES IN READINESS FOR FIBER TUFT REMOVAL THEREFROM

[75] Inventors: Ferdinand Leifeld, Kempen; Josef Temburg, Jüchen, both of Germany

[73] Assignee: Trützschler GmbH & Co. KG, Mönchengladbach, Germany

[21] Appl. No.: 936,645

[22] Filed: Aug. 28, 1992

[30] Foreign Application Priority Data

| Aug. 28, 1991 | [DE] | Germany | 4128452 |
| Sep. 21, 1991 | [DE] | Germany | 4131473 |
| Apr. 25, 1992 | [DE] | Germany | 4213718 |
| May 6, 1992 | [DE] | Germany | 4214933 |

[51] Int. Cl.[5] .............................. D01B 1/00
[52] U.S. Cl. ...................... 19/97.5; 19/80 R; 198/418.1; 414/353; 414/467; 414/509
[58] Field of Search .......... 19/97.5, 80 R, 145.5, 19/65 A; 198/418.1, 418.2, 433; 414/352, 353, 509, 512, 513, 467, 680

[56] References Cited

U.S. PATENT DOCUMENTS

| 3,458,904 | 8/1969 | Kotter et al. | 19/80 R |
| 3,736,624 | 6/1973 | Alt et al. | 19/80 R |
| 4,057,876 | 11/1977 | Sawyer . | |
| 4,497,085 | 2/1985 | Van Doorn et al. . | |
| 4,888,857 | 12/1989 | Pinto et al. | 19/80 R |
| 4,979,272 | 12/1990 | Demuth et al. | 19/80 R |
| 5,025,533 | 6/1991 | Faas et al. | 19/80 R |
| 5,079,800 | 1/1992 | Leifeld | 19/80 R |

FOREIGN PATENT DOCUMENTS

| 1150863 | 5/1969 | United Kingdom . | |
| 1438059 | 6/1976 | United Kingdom . | |
| 1568273 | 5/1980 | United Kingdom . | |
| 1591094 | 6/1981 | United Kingdom . | |
| 2078665 | 1/1982 | United Kingdom . | |
| 2199556 | 7/1988 | United Kingdom . | |
| 2251632 | 7/1992 | United Kingdom | 19/80 R |
| 91/05092 | 4/1991 | WIPO . | |
| 9105093 | 4/1991 | WIPO | 19/80 R |

Primary Examiner—Clifford D. Crowder
Assistant Examiner—Michael A. Neas
Attorney, Agent, or Firm—Spencer, Frank & Schneider

[57] ABSTRACT

An apparatus for placing fiber bales in readiness for removing fiber tufts therefrom by a travelling bale opener having an operational range, includes a first arrangement for supporting thereon a plurality of consecutively positioned fiber bales forming a standby bale series having a leading end and a trailing end; and a second arrangement for supporting thereon a plurality of consecutively positioned fiber bales forming an operational bale series to be worked on by the bale opener. The trailing end of the standby bale series is at a greater distance from the second arrangement than the leading end. The second arrangement receives fiber bales from the first arrangement for replenishing the fiber bales of the operational bale series with fiber bales of the standby bale series. The apparatus further includes a bale transporting carriage for conveying a fiber bale to the trailing end of the standby bale series and for depositing the fiber bale, conveyed by the carriage, onto the first arrangement at the trailing end to replenish the standby bale series.

33 Claims, 14 Drawing Sheets

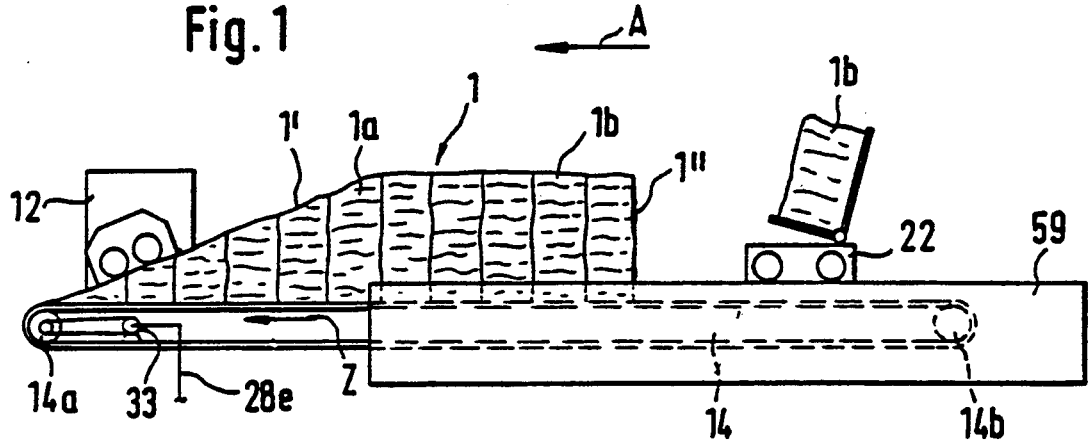
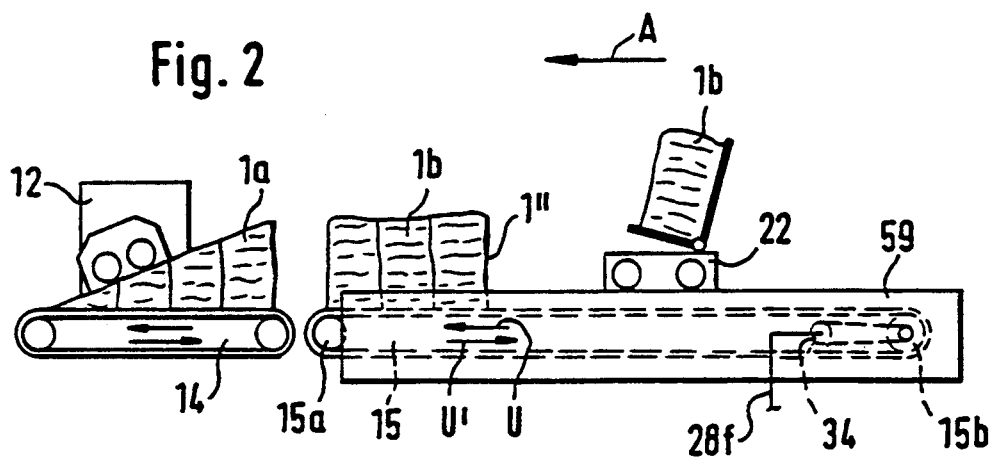
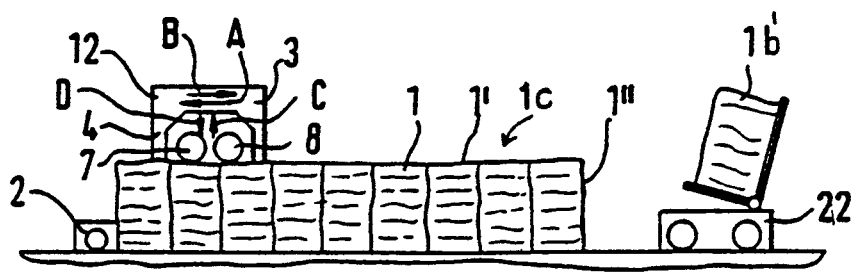

METHOD AND APPARATUS FOR PLACING FIBER BALES IN READINESS FOR FIBER TUFT REMOVAL THEREFROM

CROSS REFERENCE TO RELATED APPLICATION

This application claims the priority of German Application Nos. P 41 28 452.6 filed Aug. 28, 1991, P 41 31 473.5 filed Sep. 21, 1991, P 42 13 718.7 filed Apr. 25, 1992 and P 42 14 933.9 filed May 6, 1992, which are incorporated herein by reference. Further, this application contains subject matter related to U.S. application Ser. No. 07/936,702, filed Aug. 28, 1992.

BACKGROUND OF THE INVENTION

This invention relates to a method and an apparatus for placing fiber bales, such as cotton fiber bales, chemical fiber bales or the like in readiness for being worked on by a fiber tuft removing machine (bale opener). The bales are moved to a bale transporting apparatus such as a conveyor belt and are assembled thereon to form a standby bale series. The bales of the standby bale series are moved into a position which is in the operating range of a fiber bale opener and where the bales form an operational bale series.

In a known method as disclosed, for example, in German Offenlegungsschrift (non-examined published application) 37 30 487, the bale series situated in the operating range of the bale opener is supported on a first conveyor belt and the standby bale series is supported on an immediately adjoining second conveyor belt. At the inlet end of the second conveyor belt there is provided a transversely oriented conveyor belt on which new bales are supplied continuously to the standby bale series on the second conveyor belt. Such a procedure permits a continuous fiber tuft removing operation by the bale opener because as the bale opener operates, new fiber bales take the place of the entirely consumed (opened) fiber bales. The fiber bales are supplied to the transverse conveyor belt on a roller track.

The above-outlined process has the disadvantage that continuously new (fresh) fiber bales have to be placed onto the second conveyor belt to replenish the standby bale series: such a procedure is operationally complex. The supply of fiber bales must not be interrupted otherwise a discontinuity (gap) will appear between the standby bale series and the fiber bales complementing the standby bale series. It is a further disadvantage of the above-outlined conventional method that the sequencing and thus the mixing of the fiber bales of desired origin in the standby series are, because of the continuous resupply, also time-dependent. Such time dependency renders the process altogether rigid and necessarily predetermined. Further, the continuous complementation requires a continuous visual monitoring of the assembly of the standby bale series to make possible a timely detection and correction of operational disturbances.

SUMMARY OF THE INVENTION

It is an object of the invention to provide an improved method and apparatus of the above-outlined type from which the discussed disadvantages are eliminated and which, particularly as concerns the timing of the complementation and the origin (type) of the fiber bales to be supplied to the standby bale series permits a greater flexibility.

This object and others to become apparent as the specification progresses, are accomplished by the invention, according to which, briefly stated, the apparatus for placing fiber bales in readiness for removing fiber tufts therefrom by a travelling bale opener having an operational range, includes a first arrangement for supporting thereon a plurality of consecutively positioned fiber bales forming a standby bale series having a leading end and a trailing end; and a second arrangement for supporting thereon a plurality of consecutively positioned fiber bales forming an operational bale series to be worked on by the bale opener. The trailing end of the standby bale series is at a greater distance from the second arrangement than the leading end. The second arrangement receives fiber bales from the first arrangement for replenishing the fiber bales of the operational bale series with fiber bales of the standby bale series. The apparatus further includes a bale transporting carriage for conveying a fiber bale to the trailing end of the standby bale series and for depositing the fiber bale, conveyed by the carriage, onto the first arrangement at the trailing end to replenish the standby bale series.

By virtue of the fact that the complementation of the fiber bales of the standby bale series is timed independently of the consumption of the fiber bales by the fiber bale opener, a high flexibility is ensured as concerns the complementation and the selection of the fiber bale types of the complementing fiber bales which are supplied to the standby bale series. The cycle of the feed of the bales from the standby bale series to the operational bale series and the supply of bales to the standby bale series are thus independently timed from one another. Thus, the bale supplementation to the standby bale series may be effected individually, and a relatively large standby bale series may be assembled automatically in a relatively short period of time. This ensures the supply of bales from the standby bale series to the operational bale series for several hours. Contrary to the known process, the supply of bales to the standby series no longer needs to be constantly monitored by personnel. Further, a standby bale series may be simultaneously or in sequence assembled for a plurality of bale openers which significantly increases the operational efficiency.

According to an advantageous feature of the method, the fiber bales are transported on the transporting carriage from a pre-stored fiber bale reserve station, such as a fiber bale storage system, fiber bale preparing apparatus or the like to the bale conveying device which supports the standby bale series. According to a further feature of the invention, the fiber bales of the standby bale series are individually conveyed into a position in the operational range of the bale opener. According to still another feature of the invention, the fiber bales of the standby bale series are moved as a whole into position along the bale opener, in the operational range thereof.

The bale transporting carriage is advantageously provided for transporting and positioning fiber bales which have been stripped of wrapper and/or bale ties. Preferably, the transporting carriage is utilized in the region between the bale storage system and the bale opener.

The apparatus according to the invention includes the following additional advantageous features:

The transporting carriage has a holding device as well as an unloading device for the fiber bales.

The transporting carriage is a load-carrying carriage with chassis and runner wheels.

The transporting carriage is movable by a chain along its travel path.

The holding device has a bale support, for example, a bottom on which the fiber bales are supported.

The holding device includes a rear wall against which the fiber bales may lean.

The bottom and/or the rear wall of the transporting carriage are pivotal about a horizontal axis.

The holding device is utilized as an unloading device.

The fiber bale and the holding device are movable relative to one another for unloading the fiber bale from the transporting carriage.

The bottom may be removed from underneath the fiber bale.

The bottom is constituted by a sheet metal member or a bar grate or the like.

The bottom is constituted by a conveyor belt, a roller track or the like.

The rear wall or a pusher element associated with the rear wall is displaceable for shifting the fiber bale off the carriage.

On the transporting carriage a pivotal holding element is mounted which is in engagement with the fiber bale.

The holding element engages the fiber bale from above.

On the carriage chassis a carrier frame for the bottom and the rear wall is provided and is movable about a vertical axis relative to the chassis of the transporting carriage.

The carriage runs on a positive carriage guiding track system such as rails.

The track system is rotatable about a vertical axis together with the carriage chassis.

The transporting carriage moves on the frame of the conveying device, for example, the conveyor belt which supports the fiber bales of the standby bale series.

For the displacements of the carriage and the pivotal devices for the rear wall and/or bottom, driving devices, such as drive motors are provided.

An electronic control apparatus is provided to which the driving devices such as drive motors, are connected.

The electronic control device is controlled by a master control device, for example, for the fiber material flow.

The carriage is part of a driverless bale transport system.

The unloading device is designed for unloading the fiber bales while inclined in or opposite the direction of carriage travel.

The unloading device of the bale transporting carriage is tiltable about a horizontal axis on a pivot which is arranged approximately in the longitudinal middle of the carriage.

A displaceable conveyor belt is mounted on the carriage and functions as a bale supporting and unloading device.

The driving devices for the shiftable conveyor belt and the driving device for the transporting carriage are track-controlled and are simultaneously movable.

The conveyor device on which the standby bale series is formed is arranged along the conveyor device where the operational bale series is situated. Such an arrangement efficiently utilizes the space available in the spinning preparation plant.

The conveyor belt of the standby bale series is situated along a longitudinal side of the bale opener on that side which is remote from the operational bale series.

A transverse conveyor device is provided which adjoins the conveyor belt on which the standby bale series is formed for transferring fiber bales to the conveyor belt where the operational bale series is formed.

BRIEF DESCRIPTION OF THE DRAWINGS

FIG. 1 is a schematic side elevational view of a preferred embodiment in which a common conveyor belt is provided for accommodating an operational bale series and a standby bale series.

FIG. 2 is a schematic side elevational view of another preferred embodiment of the invention where separate conveyor belts are provided for the operational bale series and the standby bale series, respectively.

FIG. 3 is a schematic side elevational view of still another embodiment of the invention wherein the fiber bales are deposited on a stationary support along a bale opener.

FIGS. 4b and 4c are sequential schematic side elevational views illustrating a bale unloading process with the arrangement shown in FIG. 4a.

FIG. 6b is a perspective view of the carriage shown in FIG. 6a.

FIG. 21b is a schematic top plan view of the construction shown in FIG. 21a.

DESCRIPTION OF THE PREFERRED EMBODIMENTS

Figure 4A:
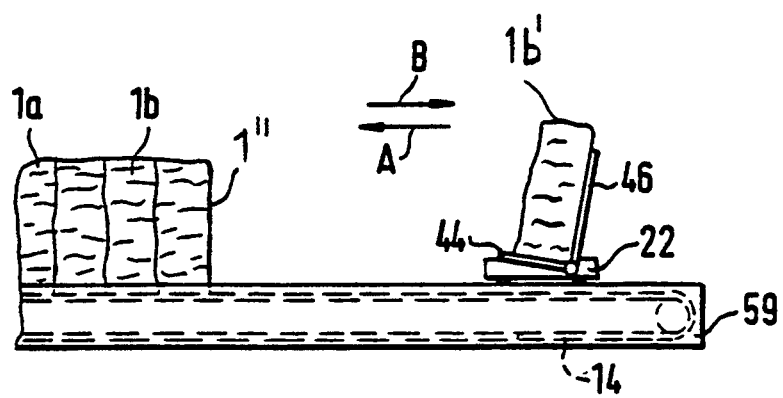
FIG. 4a is a schematic side elevational view of a detail of FIG. 1.
Figure 4B:
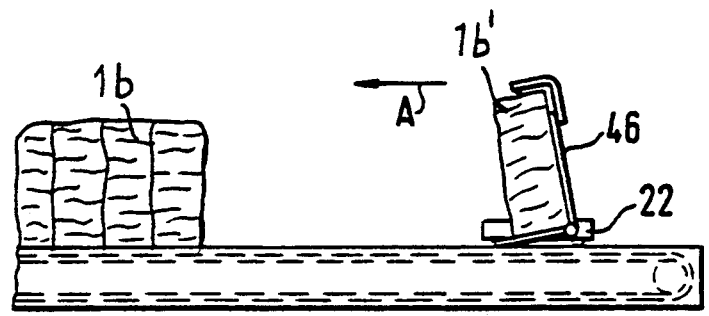

In FIGS. 1, 2 and 3 there is shown a preferred embodiment of the invention arranged for use with a bale opener 12 which may be, for example, a BLENDOMAT BDT 020 model, manufactured by Trützschler GmbH & Co. KG, Mönchengladbach, Germany. The bale opener 12 has a carriage 2 which runs on non-illustrated rails back and forth and carries a bale opener tower 4 on which, in turn, there is mounted a vertically adjustable fiber tuft detaching device 3. The detaching device 3 includes a housing which accommodates two parallel arranged opening rolls (detaching rolls) 7 and 8 that penetrate into the upper face of the fiber bales through spaces between grate bars (not shown). A suction device (also not illustrated) carries away from the bale opener 12 the fiber tufts detached from the fiber bales. Further, the housing of the detaching device 3 also supports two non-illustrated hold-down rolls flanking the detaching rolls 7 and 8. After each opening pass the detaching device 3 is lowered relative to the tower 4 in the direction of the arrow D. The detaching device 3 may also be raised relative to the tower 4 as indicated by the arrow C.

As shown in FIG. 1, the fiber bales 1 are positioned, one behind the other, on a conveyor belt 14 which is supported by end rollers 14a, 14b and which is movable by a drive motor 33 such that the upper, working reach of the conveyor belt 14 travels in the direction of the arrow Z. The fiber bales 1 situated on the conveyor belt 14 form two consecutive series: the first, left-hand series, designated at 1a, is composed of fiber bales which are being successively worked on the by the bale opener 12; the fiber bales 1 of the series 1a are thus within the operational range of the bale opener 12 and this series may therefore be termed as the "operational bale series". The second series of fiber bales supported on the conveyor belt 14 is designated at 1b. This series is composed of fiber bales which wait to be sequentially added to the operational series 1a. The second fiber bale series 1b is designated as the "standby bale series".

A bale transporting carriage 22 is further shown onto which a standby bale 1b' has been loaded earlier. The carriage 22 travels on a carrier frame 59 of the conveyor belt 14 in the direction A until it reaches the trailing vertical end surface 1" of the standby series 1b and then the fiber bale 1b' carried by the carriage 22 is deposited on the conveyor belt 14 from above immediately adjoining the end face 1". During operation of the bale opener 12, the conveyor belt 14 intermittently moves a certain distance in the direction of the arrow Z and thus, as the fiber bales are being gradually consumed by the bale opener 12, a new fiber bale, which is the leading bale in the standby series 1b, becomes part of the operational series 1a. According to the invention, the fiber bales 1b' are added to the standby series 1b independently from the cycle of the advance of the conveyor 14 in quantities as required.

In the embodiment according to FIG. 2, the operational bale series 1a is situated on a conveyor belt 14' while the standby bale series 1b is positioned on a conveyor belt 15 which is in longitudinal alignment with the conveyor belt 14'. The conveyor belt 15 is supported by end rollers 15a, 15b and is driven by a motor 34. While detaching operation is performed on the fiber bales of the operational bale series 1a, on the conveyor belt 15 a complete standby series 1b is assembled which, as a whole, is shifted in the direction of the arrow U as the conveyor belt 14 is moved, as soon as the fiber bales of the operational series 1a are entirely consumed on the conveyor belt 14'.

According to the variant shown in FIG. 3, the fiber bales 1 are assembled one behind another in a row stationarily on the floor of the spinning preparation plant. The carriage 22 brings a further fiber bale 1 to the trailing end face 1" and deposits it onto the floor to form a continuation of the fiber bale row. After the fiber bale series 1c has been assembled the detaching operation takes place along a horizontal plane (as opposed to the inclined planes shown in FIGS. 1 and 2) by the back-and-forth travelling fiber bale opener 12.

Figure 4C:
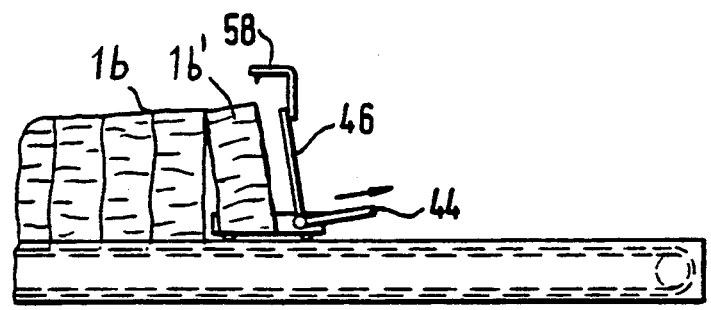

Turning to FIG. 4a, on the bale transporting carriage 22 a fiber bale 1b' is moved in the direction A towards the standby bale series 1b. The fiber bale 1b' is oriented on the carriage 22 at a tilt towards direction B. Before the carriage reaches the end face 1" of the standby series 1b with the obliquely oriented fiber bale 1b', the bottom 44 and the rear wall 46 of the carriage 22 are, as a unit, pivoted about a horizontal axis in such a manner that the fiber bale 1b' changes its inclined orientation and now tilts in the direction A. Thereafter, as shown in FIG. 4c, an upper holding element 58 is pivoted away, the bottom 44 is, in its own plane, pulled backwardly, whereupon the fiber bale 1b' is dropped onto the conveyor belt to join the standby series 1b.

Figure 5:
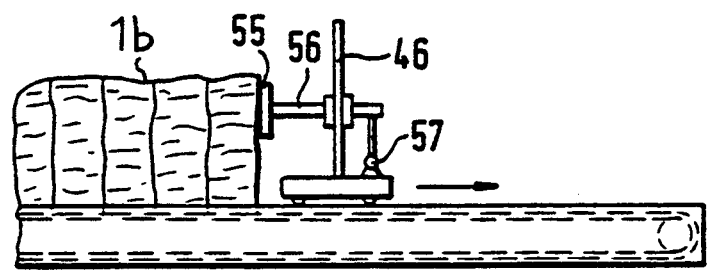
FIG. 5 is a schematic side elevational view of a further preferred embodiment of the invention utilizing a displaceable rear wall for unloading fiber bales.

In FIG. 5, a variant of the carriage 22 is illustrated. The rear wall 46 is associated with a generally horizontally shiftable pusher 55, having a lateral support bar 56 for pushing the fiber bale 1b' off the carriage 22 onto the conveyor belt 14 to join the standby series 1b. The pusher 55 and the lateral support bar 56 are actuated by a motor 57.

Figure 6A:
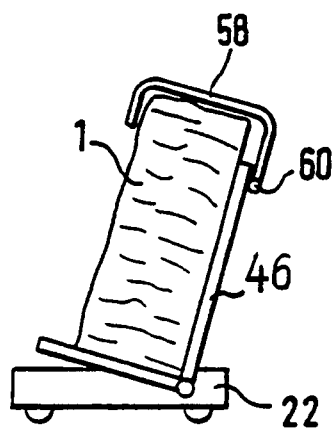
FIG. 6a is a schematic side elevational view of a bale transporting carriage having a pivotal holding element.
Figure 6B:
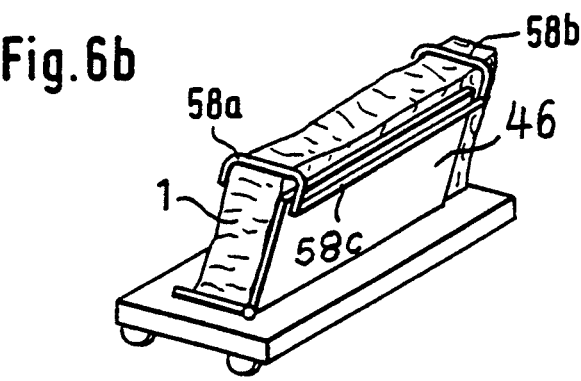

As seen in FIGS. 6a and 6b, the upper bale holding element 58 is formed of two clamp members 58a and 58b as well as a longitudinal connecting bar 58c. The upper holding element 58 is swingable about a pivot 60 formed on the upper part of the rear wall 46.

Figure 8:
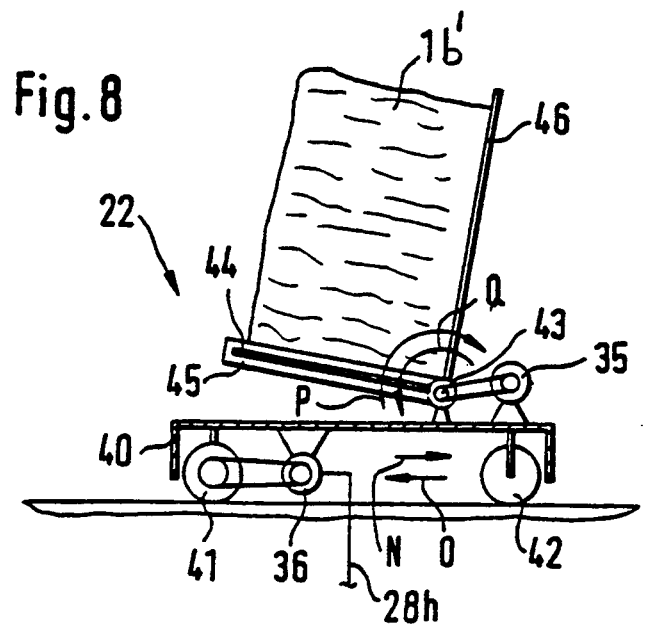
FIG. 8 is a schematic side elevational view of a preferred embodiment of a bale transporting carriage according to the invention.

Turning to FIG. 8, the carriage 22 has a chassis 40 provided with four runner wheels 41, 42 (only two are visible in FIG. 8) and is propelled by a drive motor 36 driving wheels 41 to travel horizontally in the direction of arrows N and O. On the chassis 40 there is mounted a pivot mechanism 43 to which there is attached one end of the support bottom 44 (which may a sheet metal member or a grate) together with a carrier frame 45, and the upwardly extending rear wall 46 for supporting the fiber bale 1b'. The components 44, 45 and 46 are thus pivotal about the pivot arrangement 43 individually or as a unit, indicated by the arrows P and Q.

Figure 9A:
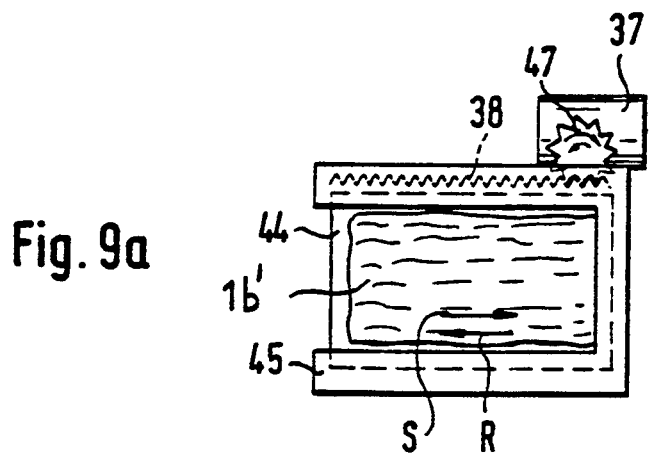
FIGS. 9a and 9b are schematic top plan views of modified parts of the transporting carriage shown in FIG. 8.
Figure 9B:
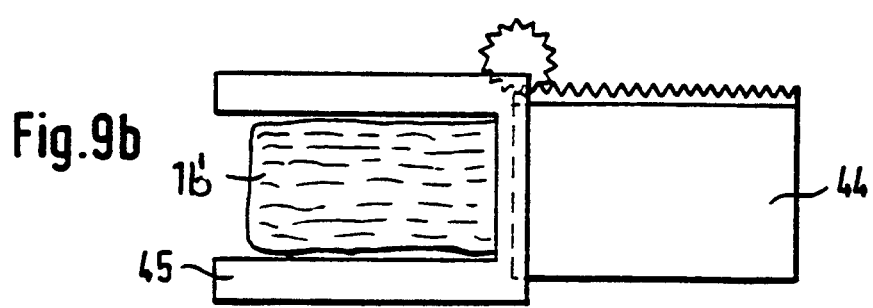

In FIG. 9a the carrier frame 45 is of forked (generally U-shaped) configuration and is thus frontally open. The support bottom 44 is shiftable in the direction of the arrows R and S by a shifting device formed of a toothed rack 38, a meshing pinion 47 and a motor 37 driving the pinion 47.

Figure 10A:
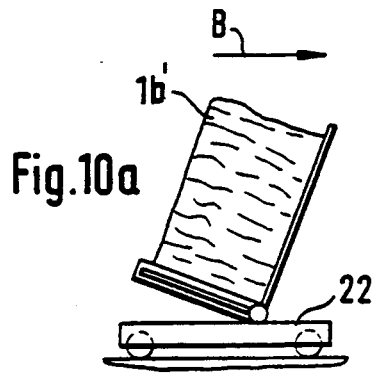
FIGS. 10a, 10b, 10c and 10d are sequential schematic side elevational views showing the operation of the transporting carriage illustrated in FIG. 8 when the fiber bale is deposited in the direction B.
Figure 10B:
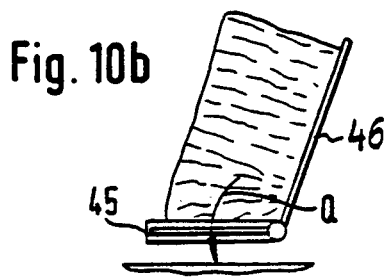
Figure 10C:
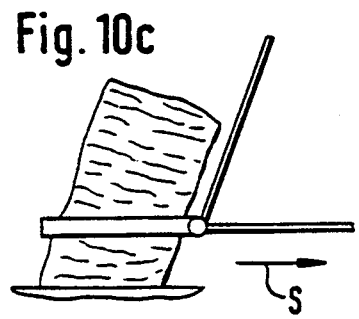
Figure 11C:
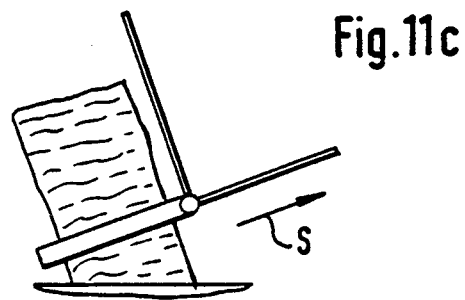
Figure 10D:
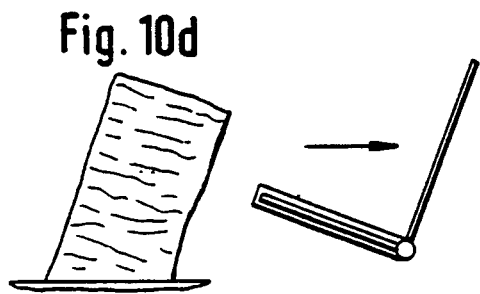
Figure 11D:
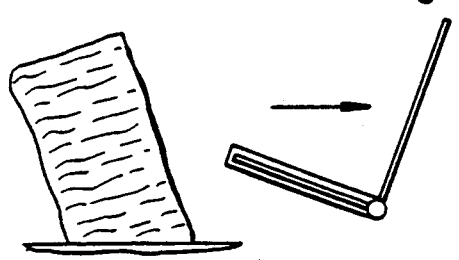

FIGS. 10a–10d schematically show in sequence the positioning of a fiber bale 1b' which is transported to the location of deposition while inclined in the direction B as shown in FIG. 10a. Thereafter, according to FIG. 10b, the carrier frame 45 is pivoted downwardly in the direction Q relative to the rear wall 46 and, as shown in FIG. 10c, the support bottom 44 is withdrawn in its own plane in the direction S so that the fiber bale 1b' may be deposited on the floor of the spinning preparation plant or on the previously described conveyor belt 14 or 14'. Thereafter, the transporting carriage 22 is moved away.

Figure 11A:
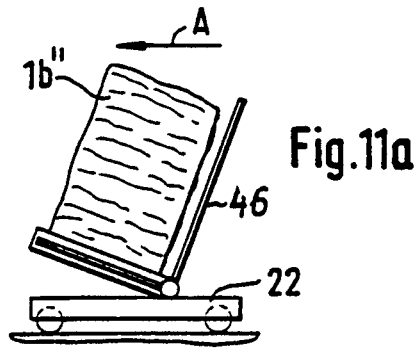
FIGS. 11a, 11b, 11c and 11d are sequential schematic side elevational views of the operation of the transporting carriage shown in FIG. 8, for depositing a fiber bale in the direction A.
Figure 11B:
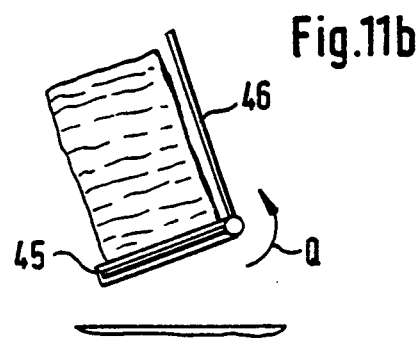

FIGS. 11a–11d schematically show the deposition of a further fiber bale 1b" which is first transported with an inclination in the direction B as shown in FIG. 11a. Thereafter, according to FIG. 11b, the carrier frame 45 and the rear wall 46 are pivoted as a unit in the direction of arrow Q and, according to FIG. 11c, the support bottom 44 is pulled away in its own plane rearwardly in the direction of the arrow S. As a result, the bale 1b" is positioned on the supporting surface (floor or conveyor belt).

Figure 12A:
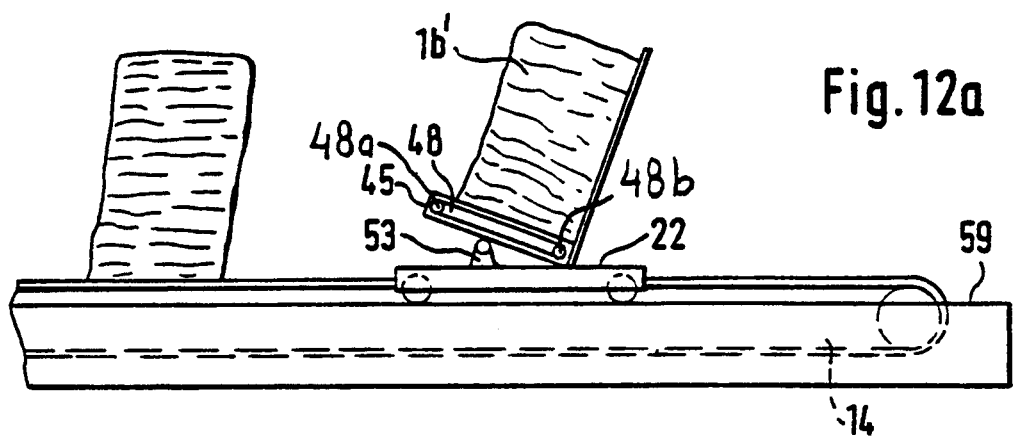
FIG. 12a is a schematic side elevational view illustrating a bale transporting carriage, having a stationary (non-shifting) conveyor belt, during the transportation of a fiber bale.
Figure 12B:
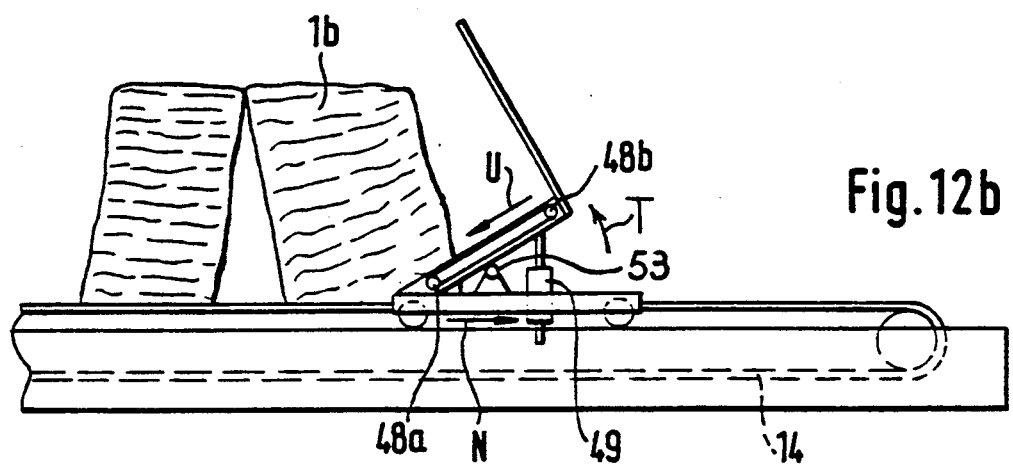
FIG. 12b is a schematic side elevational view of the structure shown in FIG. 12a depicted during unloading of a fiber bale on the conveyor belt.

In FIGS. 12a and 12b in the carrier frame 45 of the transport carriage 22 a conveyor belt 48 is arranged which is supported by end rollers 48a, 48b and on which the fiber bale 1b' is positioned. The carrier frame 45 is mounted on the carriage 12 by a pivotal support 53, by means of which the carrier frame 45, together with the conveyor belt 48 is tiltable about a horizontal axis with the aid of a pressure cylinder 49 connected between the carriage chassis and the carrier frame 45. After swinging the frame 45 and the conveyor belt 48 together with the fiber bale 1b' in the direction T, the conveyor belt 48 is circulated in the direction of the arrow U and, simultaneously, the carriage 22 travels, for example, on rails mounted on the frame 59 for the conveyor 14, in the direction of the arrow N. In this manner, the conveyor belt 48 supporting the fiber bale 1b' is slowly pulled away from under the bale 1b' and thus the latter is, without any interference with its motion, deposited on a supporting surface such as the conveyor belt 14. Thus, the conveyor belt 48 mounted on the carriage 22, simultaneously serves as a supporting bottom and as an unloading device.

Figure 13A:
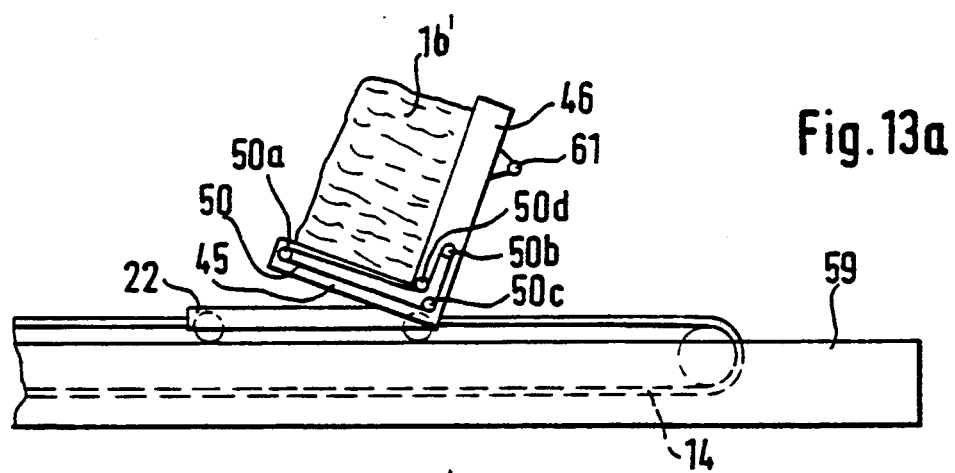
FIG. 13a is a schematic side elevational view of a further preferred embodiment of the invention including a shiftable conveyor belt functioning as a bale supporting and unloading device.
Figure 13B:
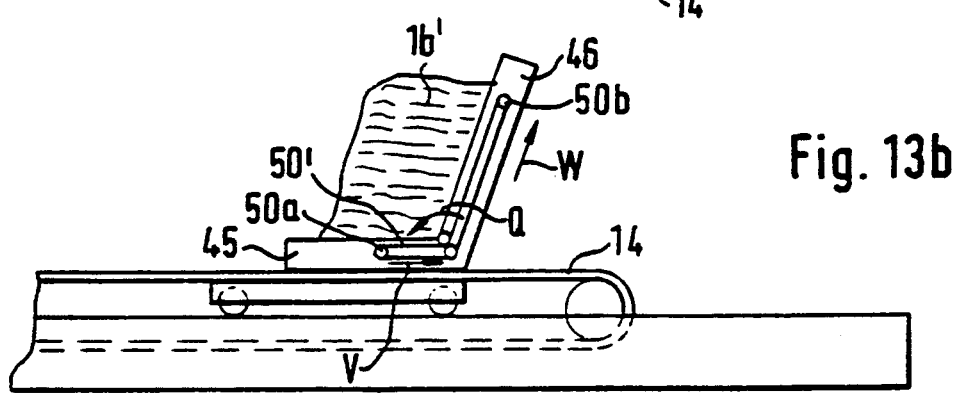
FIG. 13b is a schematic side elevational view of the structure shown in FIG. 13a, depicting another operational phase.

In FIG. 13a, the rear wall 46 is coupled to the carrier frame 45. Within the carrier frame 45 a conveyor belt 50 is arranged which is supported by end rollers 50c and 50d and which projects into the inner space of the rear wall 46. According to FIG. 13b, the carrier frame 45, together with the region of the conveyor belt 50 which is associated with the support roller 50a, is driven in the direction of the arrow Q into an approximately horizontal position while the rear wall 46 remains unchanged in its oblique orientation shown in FIG. 13a. Thereafter, the end rollers 50a and 50b are, in the respective directions V and W, slowly shifted by a motor 61. During this occurrence, the upper belt reach 50' which supports the bale 1b', rolls about the end roller 50a and thus gradually shortens in the direction V and, as a result, the bale 1b' is deposited on the conveyor belt 14. That zone of the conveyor belt 50 which is in the region of the end roller 50a thus simultaneously functioning as a supporting bottom and as an unloading device.

Figure 14:
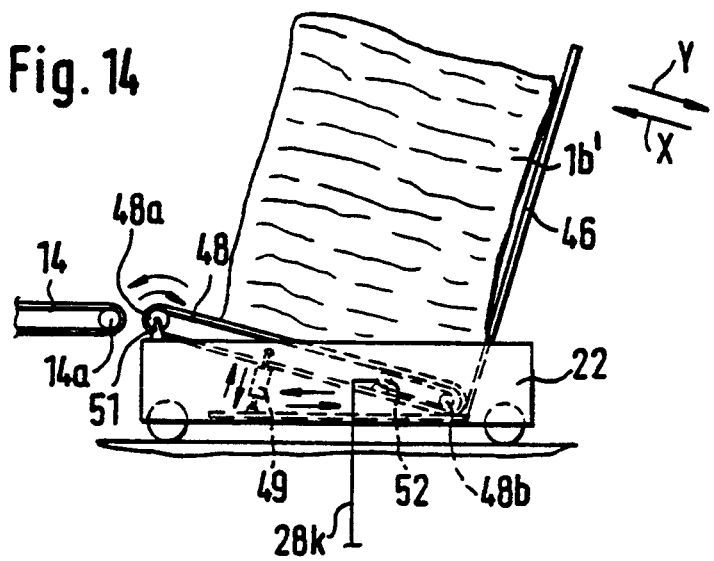
FIG. 14 is a schematic side elevational view of another preferred embodiment of a bale transporting carriage according to the invention.

In FIG. 14, the carriage 22 travels together with the conveyor belt 48 mounted thereon until the end roller 14a of the conveyor belt 14 is reached. The rear wall 46, shiftable in the direction of the arrows X, Y and the bale 1b' situated thereon are slightly inclined. The end roller 48a is associated with a pivot mechanism 51 about which the conveyor belt is swung by means of the pressure cylinder 49.

Figure 14A:
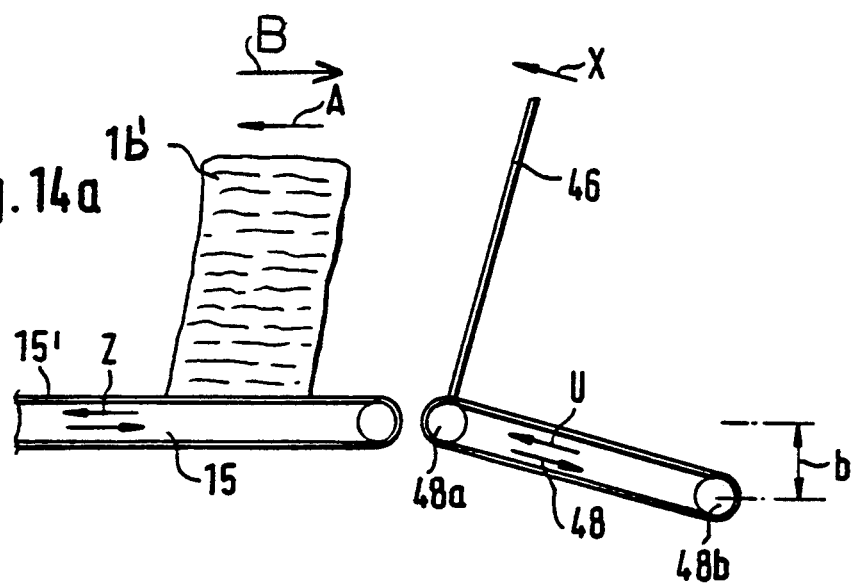
FIG. 14a is a schematic side elevational view of a fiber bale deposited on the conveyor belt for the standby bale series and leaning in the direction B.
Figure 14B:
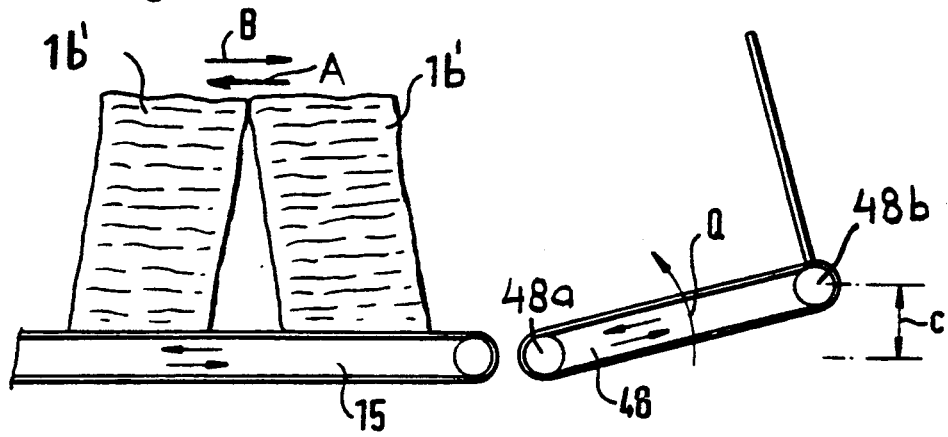
FIG. 14b is similar to FIG. 14a, showing an additional fiber bale deposited on the conveyor belt and leaning in the direction A.

As shown in FIG. 14a, the fiber bale 1b' is moved by the support belt 48 as the latter runs in the direction U and by the back wall 46 as the latter is shifted in the direction X, onto the upper reach 15' of the conveyor belt 15. At the same time, the conveyor belt 15 moves in the direction Z. The end roller 48b is supported at a level which is by a distance b lower than the level of the end roller 48a. As shown in FIG. 14b, the conveyor belt 48 is pivoted in the direction Q and the fiber bale 1b' is thereafter moved onto the conveyor belt 15 by virtue of the motion of the conveyor belt 48 in the direction of the arrow A, driven by the motor 52. By virtue of the pressure cylinder 49, the support roller 48b is lifted to a level which is by the distance c higher than the level of the end roller 48a.

Figure 15:
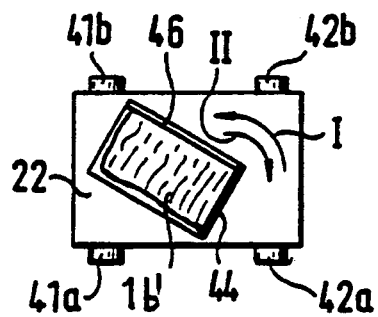
FIG. 15 is a schematic top plan view of a bale transporting carriage having a holding and loading device rotatable about a vertical axis.

As shown in FIG. 15, the support bottom 44 and the rear wall 46 are rotatably on the transporting carriage 22 in the direction of the arrows I, II about a vertical axis.

Figure 16:
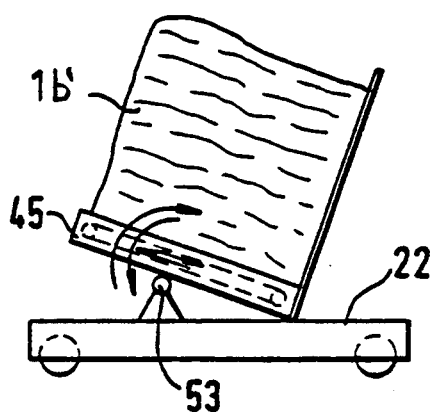
FIG. 16 is a schematic side elevational view of a bale transporting carriage having a bale supporting device pivotal about a horizontal axis.

In FIG. 16, the conveyor belt 48 for supporting the fiber bale 1b' thereon is arranged in the carrier frame 45 which is mounted on the chassis of the carriage 22 by means of a pivotal support 53 situated approximately in the middle of the length dimension (as viewed in the direction of carriage travel) of the frame 45. By means of such a positioning, the steepest inclined position in the one or the other direction may be obtained with the smallest pivotal path. The length of the conveyor belt 48 is expediently not significantly longer than the length of the fiber bale handled thereby.

Figure 17:
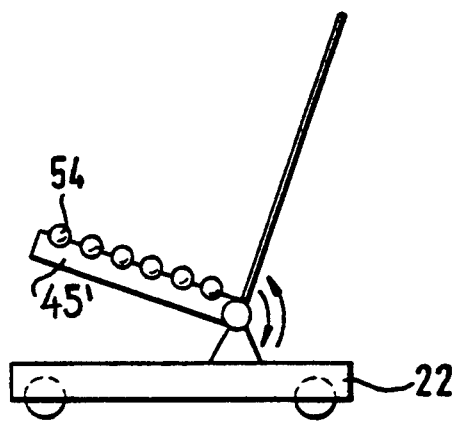
FIG. 17 is a schematic side elevational view of a bale transporting carriage having a bale supporting surface formed of a roller track.

In FIG. 17, there is shown a roller track 54 mounted on the frame 45'; the roller track which may be drivable by means not illustrated, serves as a bale supporting and unloading device.

In FIGS. 18a–18e, 19 and 20 on the two lateral longitudinal beams 59a, 59b of the carrier frame 59 rails 67a, 67b are mounted on which the carriage 22 may travel back and forth in the direction of the arrows N and O by means of its wheels 22a–22d. On the chassis 22e of the carriage 22 a carrier element 65 for the bales 1b' is arranged whose upper face 65' is oriented at an angle of 15° to the horizontal. Further, on opposite sides of the carriage 22 there are arranged two carrier units 63a, 63b at an angle of 15° to the horizontal, having respective guide elements 64a, 64b. On the guide elements 64a, 64b, perpendicularly thereto, respective support posts 66a, 66b are provided. On the support posts 66a and 66b support arms 46a, 46b and, respectively, 46c, 46d are provided. The support arms 46a–46d are supported by means of pivots 66a–66d for swinging motions in a plane perpendicular to the direction of incline of the face 65'. The posts 66a and 66b are oriented at an angle $\beta = 75°$ to the horizontal. The guide elements 64a and 64b form a rectangle with the posts 66a and 66b, respectively.

Figure 18A:
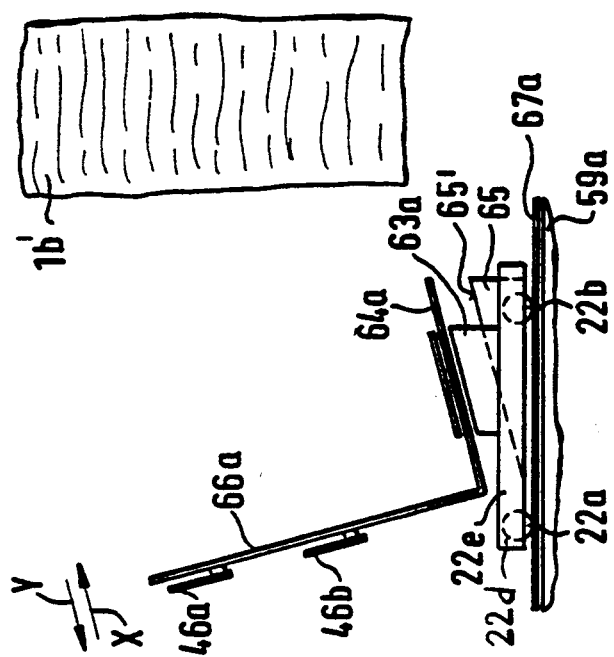
FIGS. 18a–18e are sequential schematic side elevational views showing a bale loading, transporting and depositing operation performed by a transporting carriage according to the invention.
Figure 18B:
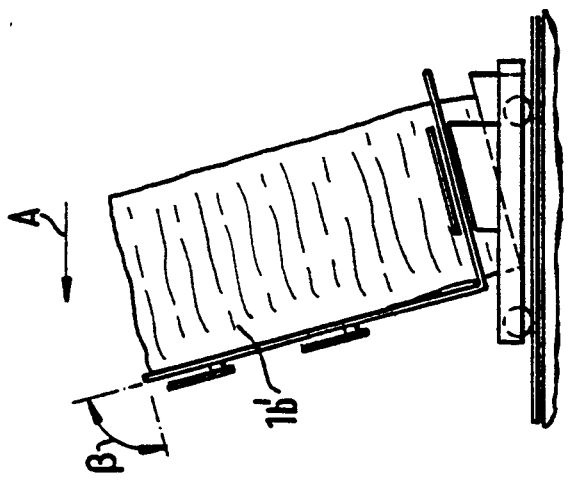
Figure 18C:
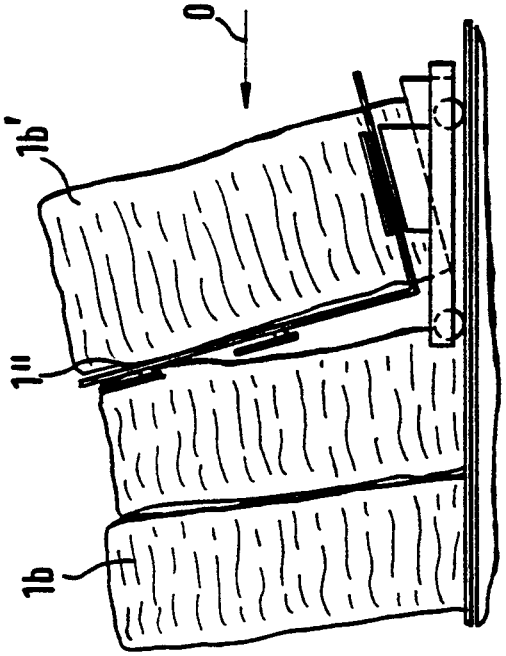
Figure 18D:
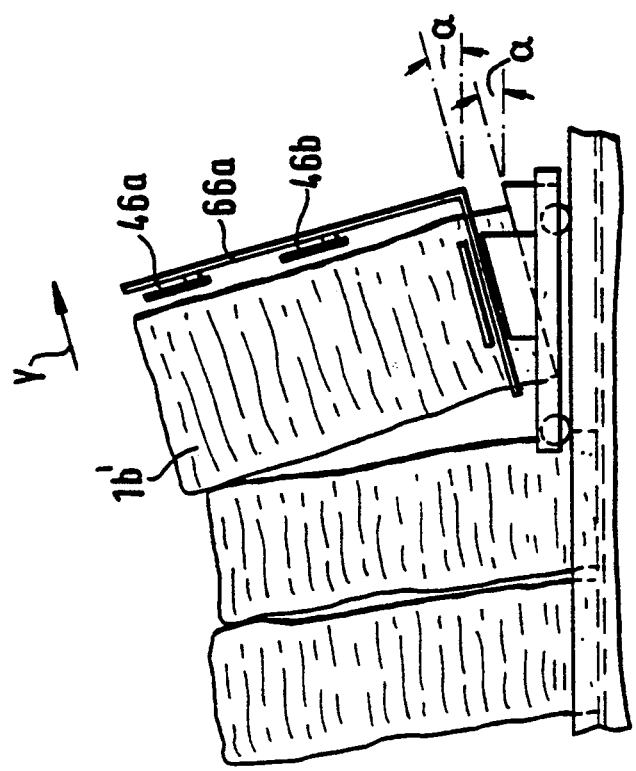
Figure 18E:
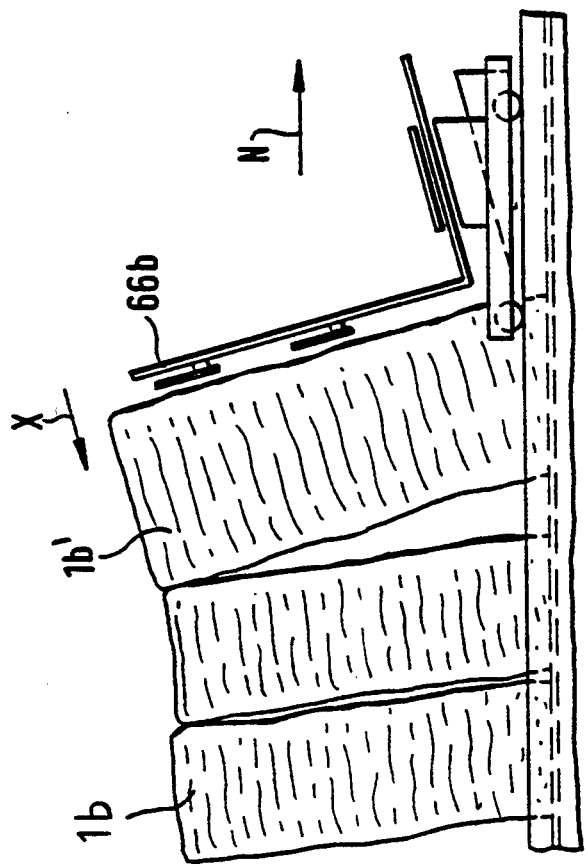
Figure 19:
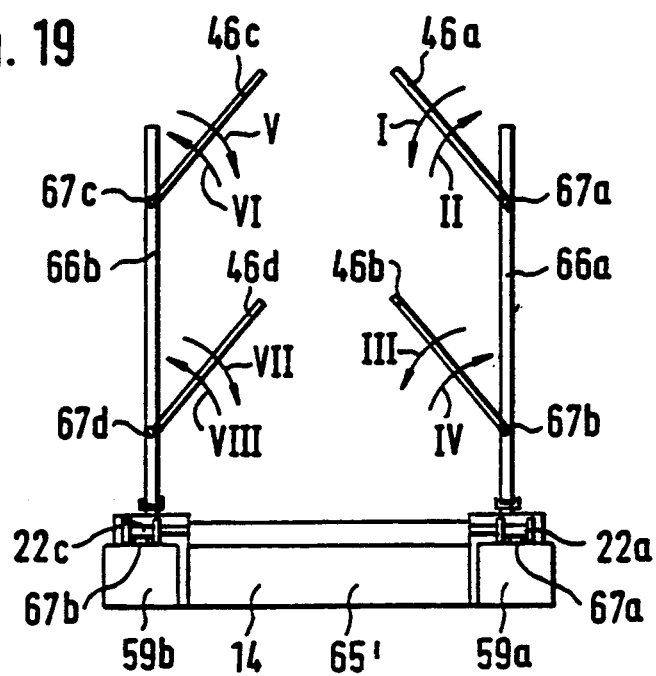
FIG. 19 is a schematic front elevational view of the bale transporting carriage illustrated in FIG. 18.
Figure 20:
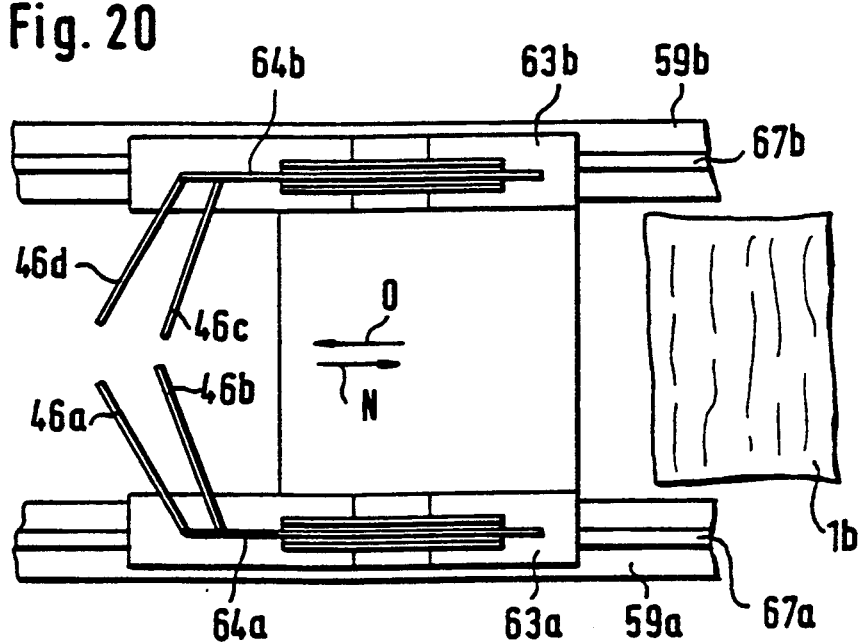
FIG. 20 is a schematic top plan view of the structure shown in FIG. 19.

In operation, the support arms 46a–46d are pivoted from an open position (FIG. 18a) in the direction of arrows I, III, V, VII (FIG. 19), so that a closed support frame is provided. Thereafter, the fiber bale 1b' is, for example, by means of a fork lift or automatically by means of a conveyor belt, roller track or the like, deposited on the upper face 65' of the carrier element 65 whereby the fiber bale 1b' is, according to FIG. 18b, oriented at an inclination in the direction of the arrow A and is in engagement with the support arms 46a–46d. The carriage travels, according to FIG. 18c in the direction of the arrow O until it reaches the terminal surface 1" of the standby bale series 1b. Thereafter, the support arms 46a–46d are pivoted back in the direction of the arrows II, IV, VI and VIII into an open position. As shown in FIG. 18d, thereafter the support posts 66a, 66b are shifted in the direction of the arrow Y whereupon the support arms 46a–46d are again closed in the direction of the arrows I, III, V and VII. Thereafter, according to FIG. 18a, the support posts 66a, 66b are shifted in the direction of the arrow X (by means of a non-illustrated shifting device). At the same time, the carriage 22 is moved rearwardly in a horizontal direction as indicated by the arrow N. As a result, the fiber bale 1b' is pushed down from the inclined surface 65' and deposited, for example, onto the conveyor belt 14. In this manner, automatically new fiber bales 1b' are added to the trailing end face 1" of the standby bale series individually and independently from the operation cycle of the conveyor belt 14 and 15.

Figure 21A:
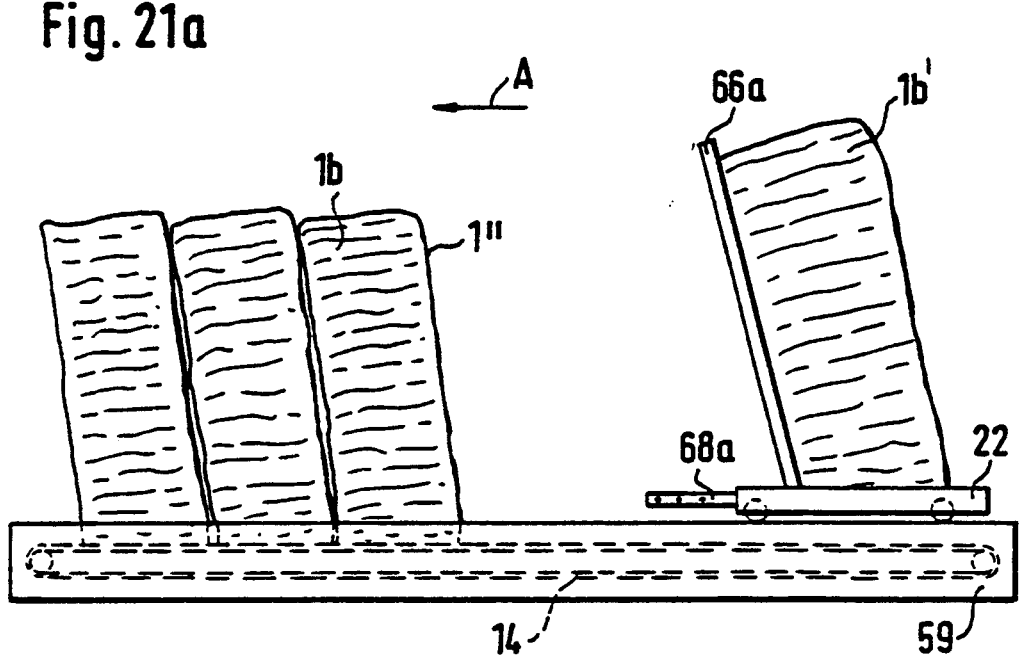
FIG. 21a is a schematic side elevational view of a transporting carriage provided with holding arms and sensors.
Figure 21B:
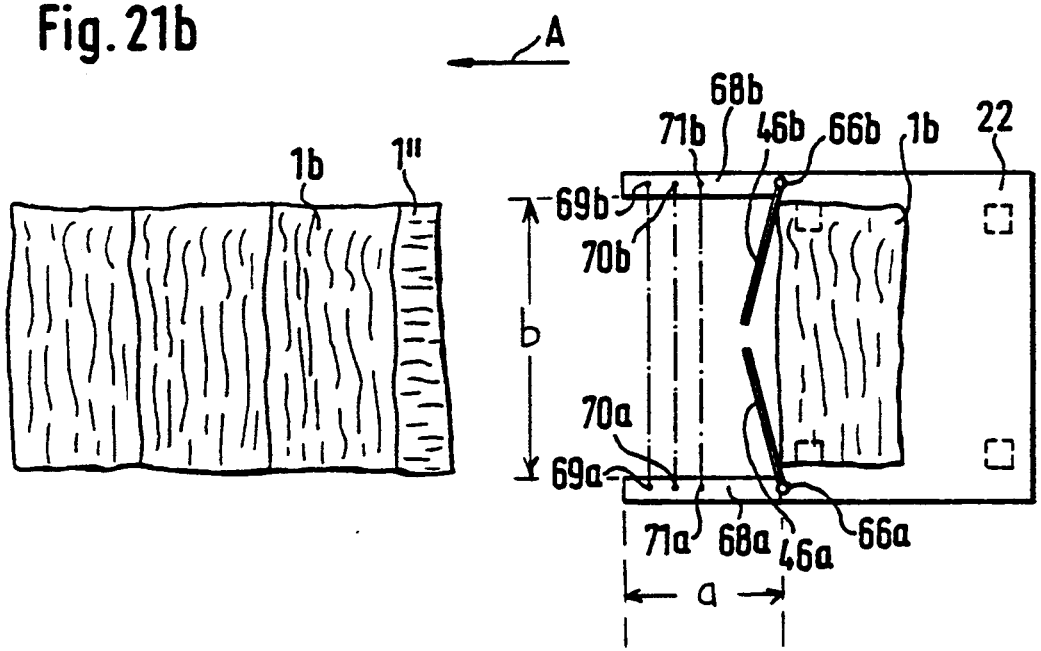

As shown in FIGS. 21a and 21b, at the front side of the carriage 22 (as viewed in the direction A, that is, in the direction of fiber bale advance on the conveyor belt 14) horizontally projecting arms 68a and 68b are provided whose free ends are at a distance a from the front end of the carriage 22. The distance b between the arms 68a and 68b is greater than the width of the fiber bales 1b' as viewed transversely to the bale series 1b or 1b. On the arms 68a and 68b there are arranged in a series, three spaced sensors 69a, 69b; 70a, 70b; and 71a, 71b (such as photocells, optical barriers, supersonic sensors or infrared sensors). The carriage 22 travels rapidly, for example, at a speed of 30 m/min towards the end face 1" of the standby bale series. First, by means of the outermost sensor 69a, 69b the end face 1" is recognized whereupon the carriage 22 slows down to approximately 10 m/min. Upon further actuation of the other sensors 70a, 70b and 71a, 71b by the face 1" the carriage 22 is stopped. The carrier arms 46a–46d which serve as holding forks are opened and the fiber bale 1b' is pushed off the surface 65'.

Figure 7:
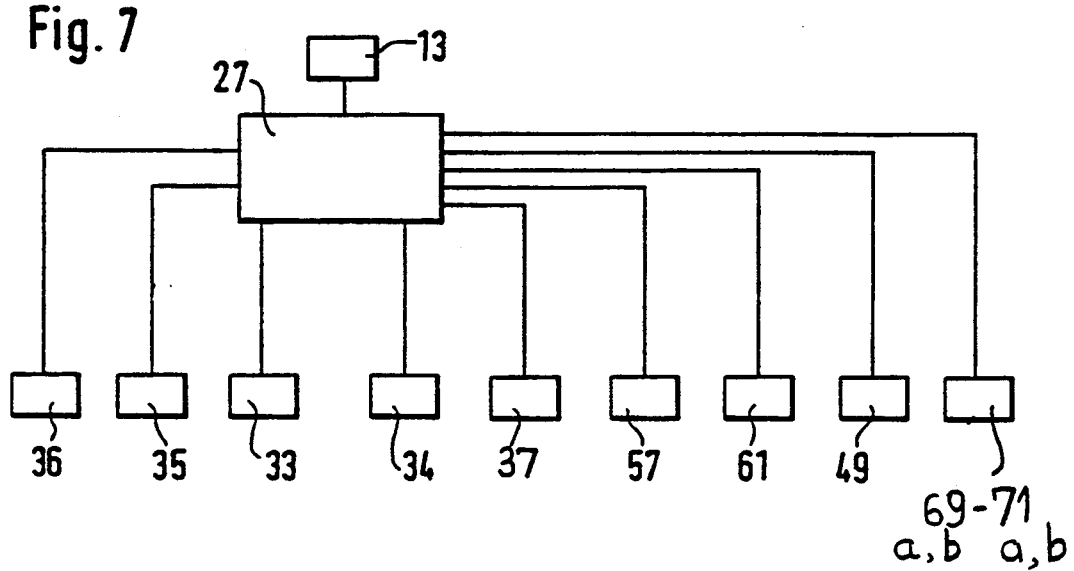
FIG. 7 is a block diagram of an electronic control device for operating the apparatus according to the invention.

In FIG. 7, there is shown a block diagram including an electronic control apparatus 27 to which a memory 13 is connected, for example, for storing data on the travelling and holding positions for the carriage 22. To the apparatus 27 there are further connected the drive motor 33 for the conveyor belt 14, the drive motor 34 for the conveyor belt 15, the drive motor 35 for tilting the bale support structure 44, 46, the drive motor 36 for propelling the carriage 22, the drive motor 37 for withdrawing the carriage bottom 44, a drive for the pressure cylinder 49 (FIG. 12b), the motor 61 for shifting the rollers 50a, 50b, the motor 52 for the support belt 48, the drive motor 63 for the conveyor belt 50, the drive motor 57 for the side bar 56 and the rear wall 46, as well as the sensors 69a, 69b, 70a, 70b, 71a and 71b. Further, to the control device 17 there may be connected a master control apparatus (not shown), for example, for the overall control of the fiber material flow.

Figure 22:
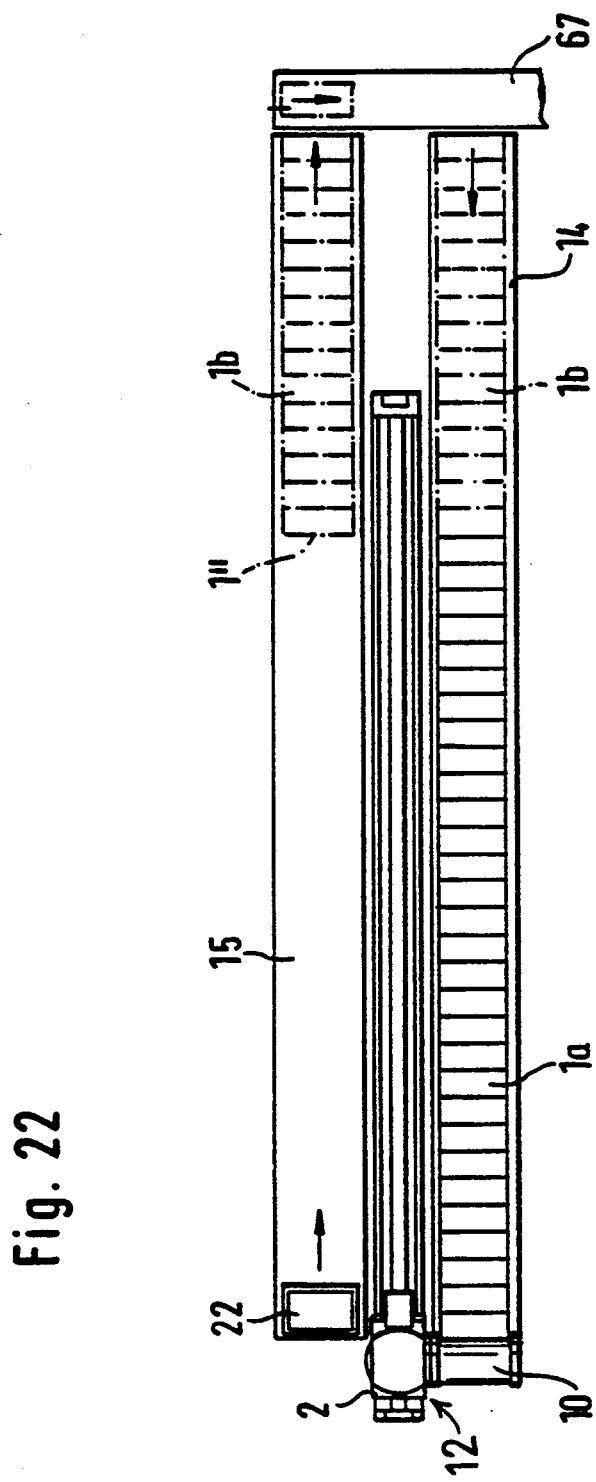
FIG. 22 is a schematic top plan view of a bale opener arranged for travel on a track and further showing a standby bale series support and an operational bale series support on opposite side of the track.

Turning to FIG. 22, there is shown a conveyor belt 14 extending along a travelling path of the bale opener 12 as well as a conveyor belt 15 which extends on the other side of the travelling path of the bale opener 12. The conveyor belt 14 supports, along a length portion which corresponds to the operating length (travel path) of the bale opener 12, the operational bale series 1a whereas that length portion of the conveyor belt 14 which is beyond the operational length of the bale opener 12 and the entire conveyor belt 15 support the fiber bales constituting the standby bale series 1b.

At one end of the conveyor belt 15 there is arranged a transverse conveyor belt 67 to transfer fiber bales of the partial standby series 1b on the conveyor belt 15 to the partial standby series 1b on the conveyor belt 14.

The transport carriage 22 is associated with the conveyor belt 15 and transports fiber bales to the momentary trailing end face 1" of the standby bale series 1b.

Figure 23:
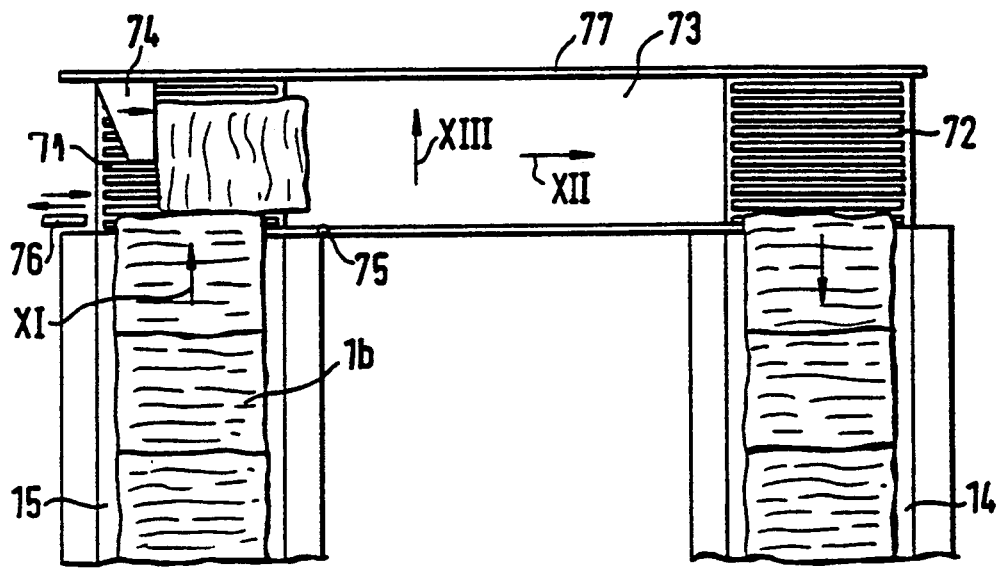
FIG. 23 is a schematic top plan view of further details of a portion of the construction shown in FIG. 22 on an enlarged scale.

Turning to FIG. 23, the opposite end portions of the transverse conveyor are formed of two roller tracks 71, 72 adjoining the discharge end of the conveyor belt 15 and the intake end of the conveyor belt 14, respectively. Between the two roller tracks 71 and 72 a smooth flat conveyor surface 73 is provided which may be formed, for example, of sheet metal. The roller track 71 is associated with a pusher element 74 (driven in a non-illustrated manner) which displaces individually fiber bales from the roller track 71 over the smooth surface 73 to the roller track 72. At the discharge end of the conveyor belt 15 there is situated a sensor 75, for example, a photocell, across which a holding element such as a holding arm 76 is positioned. The rear wall 77 extending along the roller tracks 71, 72 and along the smooth conveying surface 73 is shiftable perpendicularly to the direction of conveyance on the conveyor belt 15.

During the operation of the apparatus according to FIG. 23, the fiber bales are, in the direction of the arrow XI transferred from the conveyor belt 15 to the roller track 71. Thereafter, the fiber bales are, by the pusher element 74, shifted in the direction of the arrow XII. The sensor 75 is thereby actuated and it is thus recognized that the bale has not yet been entirely transferred to the transverse conveyor 71–77. Thereupon the bale transport is interrupted. The entire transverse transporting device, together with the rear wall 77 and the pusher element 74 is displaced in the direction of the arrow XIII further rearwardly until the sensor emits a signal indicating the absence of a fiber bale. Thereafter, the fiber bale is shifted in the direction of the arrow XII. At the same time, the holding element 76 is shifted in the direction of the arrow XII and supports the successive fiber bale on the conveyor belt 15.

Figure 24:
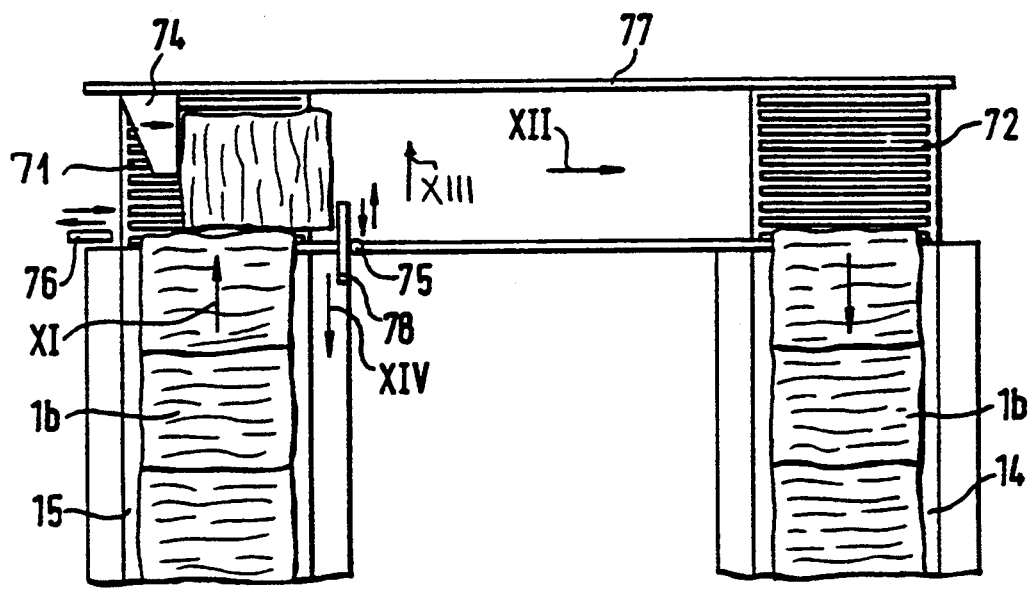
FIG. 24 is a view similar to FIG. 23, illustrating a variant thereof.

FIG. 24 illustrates an apparatus similar to FIG. 23, in which, however, each holding element 78 for the fiber bales is situated at the side of the sensor 75.

During operation of the apparatus according to FIG. 24, two fiber bales are shifted from the conveyor belt 15 onto the roller track 71. The holding element 78 with the sensor 75 travels in the direction of the arrow XIII, for example, through a distance of 350 mm towards the stationary rear wall 77. Thereafter, the leading fiber bale is, by virtue of the pusher 74, displaced in the direction of the arrow XII. The sensor 75 emits a signal since the fiber bale is wider than 350 mm. Thereupon the holding element 78, together with the sensor 75, moves so long in the direction of the arrow XIV backward, until the leading fiber bale is freed. Simultaneously, the holding element 76 is shifted forwardly and supports the successive bale 1 at its frontal face. Thereafter, the leading fiber bale may be pushed further in the direction of the arrow XII. In this embodiment the rear wall 77 is not shiftable. The holding element for the successive bale is combined with a simultaneous width recognition of the fiber bales.

It will be understood that the above description of the present invention is susceptible to various modifications, changes and adaptations, and the same are intended to be comprehended within the meaning and range of equivalents of the appended claims.

What is claimed is:

1. An apparatus for placing fiber bales in readiness for removing fiber tufts therefrom by a travelling bale opener having an operational range; said apparatus comprising:
   (a) first means for supporting thereon a plurality of consecutively positioned fiber bales forming a standby bale series having a leading end and a trailing end;
   (b) second means for supporting thereon a plurality of consecutively positioned fiber bales forming an operational bale series to be worked on by the bale opener; the trailing end of the standby bale series being farther from said second means than said leading end; said second means receiving fiber bales from said first means for replenishing the fiber bales of the operational bale series with fiber bales of the standby bale series; and
   (c) a bale transporting means for conveying a fiber bale along said first means to the trailing end of the standby bale series and for depositing the fiber bale onto said first means at said trailing end to replenish the standby bale series; said bale transporting means comprising a carriage.

2. An apparatus as defined in claim 1, wherein said first and second means comprises a single conveyor belt having a bale-supporting surface divided into consecutive first and second length portions; said first length portion supporting the standby bale series and said second length portion supporting the operational bale series; and a drive motor for moving the bale-supporting surface in a direction oriented from the first length portion to the second length portion.

3. An apparatus as defined in claim 1, wherein said first means comprises a first conveyor belt and a first drive motor for circulating the first conveyor belt; said second means comprises a second conveyor belt in longitudinal alignment with the first conveyor belt and a second drive motor for circulating the second conveyor belt.

4. An apparatus as defined in claim 1, wherein said carriage comprises an unloading mechanism for removing a fiber bale from said carriage and for depositing the fiber bale externally of the carriage; further comprising first motor means for propelling said carriage and second motor means for operating said unloading mechanism; and an electronic control apparatus connected to said first and second motor means for controlling a travel of said carriage and an operation of said unloading mechanism.

5. An apparatus as defined in claim 1, wherein said carriage has a forwardly travelling direction; further comprising two lateral arms mounted on the carriage and projecting forwardly therefrom; and sensor means mounted on said lateral arms for emitting sensing signals when said sensor means senses a presence of the trailing end of said standby bale series as the carriage approaches the standby bale series.

6. An apparatus as defined in claim 1, wherein said first means comprises a belt conveyor including
   (a) a conveyor belt having a length;
   (b) a frame for supporting the conveyor belt therein; said frame having two opposite longitudinal beams extending along the conveyor belt and flanking the conveyor belt; each longitudinal beam having an upper longitudinal edge face; and
   (c) a rail secured to each said upper longitudinal edge face for supporting said carriage for travel thereon parallel to the length of the conveyor belt.

7. An apparatus as defined in claim 1, wherein said carriage has a bottom including a supporting surface for supporting a fiber bale thereon.

8. An apparatus as defined in claim 7, wherein said bottom comprises a roller track on which the fiber bale is shiftable off the carriage.

9. An apparatus as defined in claim 7, wherein said carriage comprises a chassis and said bottom is supported in said chassis to be slidable relative to the chassis, generally in a plane of the supporting surface, for moving the bottom out from under the fiber bale to allow the fiber bale to drop out of the carriage.

10. An apparatus as defined in claim 9, wherein said carriage comprises a chassis and said bottom comprises a conveyor belt having a belt length and being supported in said chassis; said conveyor belt being movable parallel to the supporting surface thereof for unloading a fiber bale supported thereon.

11. An apparatus as defined in claim 10, further comprising end rollers supported in the chassis; said conveyor belt being trained about said end rollers and means for pivoting said conveyor belt about one of said end rollers, about a horizontal axis oriented perpendicularly to said belt length.

12. An apparatus as defined in claim 10, further comprising pivot means for tilting the conveyor belt about a horizontal axis oriented perpendicularly to the belt length.

13. An apparatus as defined in claim 12, wherein said pivot means is situated approximately at mid-length of said chassis as measured parallel to the belt length.

14. An apparatus as defined in claim 1, wherein said carriage has a generally upwardly extending rear wall for engaging a rear face of a fiber bale supported on the carriage.

15. An apparatus as defined in claim 14, further comprising a pusher means mounted on said rear wall for pushing a fiber bale, supported on the carriage, away from the rear wall and off said carriage.

16. An apparatus as defined in claim 14, wherein said carriage comprises a chassis and a bottom including a supporting surface for supporting a fiber bale thereon; further comprising means for supporting said rear wall and said bottom on said chassis for rotation as a unit about a vertical axis.

17. An apparatus as defined in claim 14, further wherein said carriage has a bottom including a supporting surface for supporting a fiber bale thereon; further comprising means for linearly shifting said rear wall parallel to itself along said bottom for pushing the fiber bale off the carriage.

18. An apparatus as defined in claim 17, further comprising a holding means secured to a top part of said rear wall for pivotal motion about a horizontal axis and for engaging and holding a top part of the fiber bale positioned on the carriage.

19. An apparatus as defined in claim 17, wherein said carriage further comprises a bottom including a supporting surface for supporting a fiber bale thereon; and pivot means for tilting the bottom and the rear wall relative to one another about a horizontal axis.

20. An apparatus as defined in claim 19, wherein said carriage comprises a chassis and said bottom comprises a conveyor belt; further comprising end rollers supported in said chassis and in said rear wall; said conveyor belt being trained about said end rollers; further comprising means for shifting said end rollers for varying a length of said supporting surface.

21. An apparatus as defined in claim 17, wherein said carriage further comprises a bottom including a supporting surface for supporting a fiber bale thereon; and pivot means for tilting the bottom and the rear wall as a unit about a horizontal axis for removing the fiber bale from said carriage.

22. An apparatus as defined in claim 21, wherein said pivot means is situated approximately at mid-length of the carriage as measured in a direction parallel to a travelling direction of the carriage.

23. An apparatus as defined in claim 21, further comprising a power means mounted on said carriage for tilting said bottom and said rear wall about said horizontal axis.

24. An apparatus as defined in claim 21, wherein said carriage comprises a chassis and said bottom comprises a conveyor belt; further comprising end rollers supported in the chassis; said conveyor belt being trained about said end rollers; said pivot means tilting said conveyor belt and said rear wall about one of said end rollers.

25. An apparatus for placing fiber bales in readiness for removing fiber tufts therefrom by a travelling bale opener having an operational range; said apparatus comprising:
 (a) first means for supporting thereon a plurality of consecutively positioned fiber bales forming a standby bale series having a leading end and a trailing end;
 (b) second means for supporting thereon a plurality of consecutively positioned fiber bales forming an operational bale series to be worked on by the bale opener; the trailing end of the standby bale series being farther from said second means than said leading end; said second means receiving fiber bales from said first means for replenishing the fiber bales of the operational bale series with fiber bales of the standby bale series;
 (c) a bale transporting means for conveying a fiber bale along said first means to the trailing end of the standby bale series and for depositing the fiber bale onto said first means at said trailing end to replenish the standby bale series; and
 (d) third means for transferring fiber bales of the standby bale series from said first means onto said second means for replenishing the fiber bales of the operational bale series with fiber bales of the standby bale series.

26. An apparatus as defined in claim 25, wherein said first means comprises a first conveyor having a discharge end and a direction of conveyance oriented towards said discharge end; further wherein said second means comprises a second conveyor having an inlet end and a direction of conveyance oriented away from said inlet end; said first and second conveyors being oriented parallel to and spaced from one another to accommodate a travelling bale opener therebetween; said third means comprising a third conveyor extending transversely to said first and second conveyors and interconnecting said discharge end of said first conveyor with said inlet end of said second conveyor.

27. An apparatus as defined in claim 26, wherein said third conveyor comprises a supporting surface onto which fiber bales are transferred from said first conveyor and a driven pusher element displaceable along said supporting surface of said third conveyor for shifting fiber bales on said supporting surface of said third conveyor from the discharge end of said first conveyor to the inlet end of said second conveyor.

28. An apparatus as defined in claim 26, wherein said third conveyor comprises a first roller track aligned with the discharge end of said first conveyor, a second roller track aligned with the inlet end of said second conveyor and a planar bale supporting surface extending between said first and second roller tracks.

29. An apparatus as defined in claim 28, wherein said third conveyor further comprises a rear wall extending from said discharge end of said first conveyor to the inlet end of said second conveyor; said rear wall being shiftable parallel to the direction of conveyance on said first and second conveyors.

30. An apparatus as defined in claim 29, wherein said third conveyor further comprises a stationary rear wall extending from said discharge end of said first conveyor to the inlet end of said second conveyor.

31. An apparatus as defined in claim 29, further comprising sensor means situated at said discharge end of said first conveyor for emitting a signal upon passage of a fiber bale on said first conveyor beyond said discharge end thereof.

32. An apparatus as defined in claim 31, further comprising a bale retaining element situated at said discharge end of said first conveyor in alignment with said sensor means; said bale retaining element being shiftable transversely to said conveying direction of said first conveyor into bale engaging and bale releasing positions.

33. A method of placing fiber bales in readiness for removing fiber tufts therefrom by a travelling bale opener having an operational range, comprising the following cyclical steps:
 (a) placing a fiber bale on a fiber bale transporting device;

(b) moving the device to and along a conveyor;
(c) forming and complementing a standby bale series on the conveyor by depositing the fiber bale on the conveyor so that the bale is set on the conveyor in a face-to-face relationship with a trailing end face of a last-deposited bale of the standby bale series regardless where the last-deposited bale is located on the conveyor; and (d) forming and complementing an operational bale series in the operational range of the bale opener by advancing fiber bales from the standby bale series to the operational bale series; said forming and complementing step including the step of individually advancing the fiber bales from a leading end of the standby bale series to the operational bale series.

* * * * *